(12) United States Patent
Shima

(10) Patent No.: US 9,895,935 B2
(45) Date of Patent: Feb. 20, 2018

(54) PNEUMATIC TIRE

(71) Applicant: TOYO TIRE & RUBBER CO., LTD., Osaka-shi, Osaka (JP)

(72) Inventor: Satoshi Shima, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 281 days.

(21) Appl. No.: 14/805,651

(22) Filed: Jul. 22, 2015

(65) Prior Publication Data

US 2016/0023516 A1  Jan. 28, 2016

(30) Foreign Application Priority Data

Jul. 23, 2014  (JP) .................................. 2014-149845

(51) Int. Cl.
*B60C 11/13* (2006.01)
*B60C 9/22* (2006.01)
*B60C 9/18* (2006.01)
*B60C 9/20* (2006.01)

(52) U.S. Cl.
CPC ........ *B60C 11/1376* (2013.01); *B60C 9/2009* (2013.01); *B60C 2009/1828* (2013.01); *B60C 2009/2271* (2013.01)

(58) Field of Classification Search
CPC . B60C 9/22; B60C 9/2204; B60C 2009/2266; B60C 2009/2271; B60C 11/1376
See application file for complete search history.

(56) References Cited

U.S. PATENT DOCUMENTS

| 4,293,019 A | * | 10/1981 | Maiocchi | .............. B60C 9/2006 |
| | | | | 152/527 |
| 2006/0196590 A1 | * | 9/2006 | Maurel | ..................... B60C 9/20 |
| | | | | 152/531 |
| 2011/0079334 A1 | * | 4/2011 | Bott | .................... B60C 11/0302 |
| | | | | 152/209.14 |
| 2014/0283965 A1 | * | 9/2014 | Takahashi | ........... B60C 11/0008 |
| | | | | 152/209.5 |

FOREIGN PATENT DOCUMENTS

| JP | 56-071604 | * | 6/1981 |
| JP | 2001-322405 A | | 11/2001 |
| JP | 2003-200711 A | | 7/2003 |
| JP | 2005-263180 | * | 11/2005 |
| JP | 2013-124011 | * | 6/2013 |

* cited by examiner

*Primary Examiner* — Robert Dye
(74) *Attorney, Agent, or Firm* — Westerman, Hattori, Daniels & Adrian, LLP

(57) ABSTRACT

A pneumatic tire includes a belt layer, a belt reinforcing layer in which a plurality of reinforcing cords are arranged, four main grooves, and land portions comparted by the four main grooves, wherein in the case that the belt reinforcing layer is partitioned into five areas in a tire width direction by the four main grooves, an arrangement density of the reinforcing cord in the fifth area is higher than that of the reinforcing cord in the first area, and an arrangement density of the reinforcing cord in the second area is higher than that of the reinforcing cord in the fourth area, and wherein protruding portions having protruding heights in proportion to the arrangement densities are provided on ground surfaces of the land portions which are positioned outside in the tire diametrical direction in the areas having the higher density than that of the third area.

8 Claims, 6 Drawing Sheets

PNEUMATIC TIRE

BACKGROUND OF THE INVENTION

Field of the Invention

The present invention relates to a pneumatic tire having a belt layer which is buried in a tread portion, and a belt reinforcing layer which is arranged in an outer side in a tire diametrical direction of the belt layer.

Description of the Related Art

Conventionally, in a pneumatic tire, for the purpose of improving a high-speed durability and improving a steering stability, one or more belt reinforcing layers are provided between the tread rubber and the belt layer.

In the following patent document 1, there is described a pneumatic tire in which belt reinforcing layers constructed by an organic fiber are provided in an outer side of a belt layer, and a driving number of the belt reinforcing layers is reduced little by little from a bent end toward a center side, for the purpose of improving the high-speed durability without deteriorating a smooth handling property at the cornering.

A tire ground pressure distribution when a vehicle turns is the highest at a shoulder portion of a vehicle installation outer side (hereinafter, also referred to as an out side) of a tire positioned in an outer side (hereinafter, referred to as an outer wheel), and is next higher at a shoulder portion of a vehicle installation inner side (hereinafter, also referred to as an in side) of a tire positioned in an inner side (hereinafter, referred to an inner wheel). As a result, if the belt reinforcing layers are arranged in symmetrical to a tire equator such as the pneumatic tire of the patent document 1, there is a risk that the reinforcement is insufficient at the out side of the outer wheel and a sufficient cornering power cannot be obtained when a vehicle turns, or there is a risk that the reinforcement becomes excessive at the in side of the inner wheel and a weight is increased. On the other hand, if the belt reinforcing layers are arranged in asymmetrical to the tire equator, expansion coefficient is different between right and left and a conicity may be increased.

Further, in the following patent document 2, there is described a pneumatic tire provided with asymmetric patterns which are differentiated in tread patterns between both sides of a tire equator in a tread portion, wherein the pneumatic tire is differentiated in a cord arrangement density of the belt reinforcing layer between right and left of the tire equator. As a result, increase of the conicity in the tire having the asymmetric pattern is suppressed without causing any weight increase.

However, the invention according to the patent document 2 is the pneumatic tire having the asymmetric pattern, and if the cord arrangement density of the belt reinforcing layer is differentiated between right and left of the tire equator in the tire having the symmetric pattern, the expansion coefficients are different between right and left, and the conicity is increased.

PRIOR ART DOCUMENT

Patent Document

Patent Document 1: JP-A-2001-322405
Patent Document 2: JP-A-2003-200711

SUMMARY OF THE INVENTION

The present invention is made by taking the actual condition mentioned above into consideration, and an object of the present invention is to provide a pneumatic tire which can achieve a sufficient cornering power when the vehicle turns, while suppressing increase of a conicity.

The object can be achieved by the following present invention. That is, the present invention provides a pneumatic tire includes a belt layer which is buried in a tread portion, a belt reinforcing layer which is arranged in an outer side in a tire diametrical direction of the belt layer and in which a plurality of reinforcing cords extending along a tire circumferential direction are arranged, four main grooves which are formed on an outer surface of the tread portion, and are arranged two by two in both sides with a tire equator interposed therebetween, and land portions which are comparted by the four main grooves, wherein in the case that the belt reinforcing layer is partitioned into five areas constituted by a first area, a second area, a third area, a fourth area and a fifth area in a tire width direction from a vehicle installation inner side toward a vehicle installation outer side in this order by the four main grooves, an arrangement density of the reinforcing cord in the fifth area is higher than an arrangement density of the reinforcing cord in the first area, and an arrangement density of the reinforcing cord in the second area is higher than an arrangement density of the reinforcing cord in the fourth area, and wherein protruding portions having protruding heights in proportion to the arrangement densities are provided on ground surfaces of the land portions which are positioned outside in the tire diametrical direction in the areas having the higher density than that of the third area, out of the first area, the second area, the fourth area and the fifth area.

In the pneumatic tire according to the present invention, the belt reinforcing layer is arranged at the outer side in the tire diametrical direction of the belt layer. A plurality of reinforcing cords extending along the tire circumferential direction are arranged in the belt reinforcing layer. In the case that the belt reinforcing layer is partitioned into five areas in the tire width direction by four main grooves, the arrangement density of the reinforcing cord in the fifth area which is closest to the vehicle installation outer side is higher than the arrangement density of the reinforcing cord in the first area which is closest to the vehicle installation inner side. As a result, since it is possible to optimize the reinforcement strength at the right and left shoulder portions of the tire equator, it is possible to achieve a sufficient cornering power even at the vehicle turning time, while suppressing increase of weight. On the other hand, in the case that the reinforcement strength is differentiated between right and left of the equator, the expansion coefficient is different between right and left and the conicity tends to be increased. According to the present invention, since the arrangement density of the reinforcing cord in the second area existing at the vehicle installation inner side is higher than the arrangement density of the reinforcing cord in the fourth area existing at the vehicle installation outer side, the reinforcement strengths at right and left of the tire equator get close and it is possible to suppress the increase of the conicity.

Since a ground contact length becomes shorter by making the arrangement density of the reinforcing cord higher, a ground contact shape becomes irregular in the case that the arrangement density of the reinforcing cord is differentiated in each of the areas, so that the ground contact shape becomes irregular, and there is a risk that an irregular wear resistance is deteriorated. The ground contact length in the land portion becomes longer by the provision of the protruding portion in the ground surface of the land portion which is positioned at the outer side in the tire diametrical direction of the area having the high arrangement density. Further, since the ground contact shape can be optimized by making the protruding height of the protruding portion proportional to the arrangement density, it is possible to maintain the irregular wear resistance.

In the pneumatic tire according to the present invention, the arrangement density in each of the areas is preferably higher than the arrangement density in the area which is closer to the inner side in the tire width direction than the former area. According to the structure, since the rigidity at the shoulder portions in both sides is improved, the tire deformation can be suppressed and it is possible to effectively improve the cornering power.

In the pneumatic tire according to the present invention, a protruding end of the protruding portion is preferably positioned closer to the inner side in the tire diametrical direction than the tire largest outer diameter in a tire equator. According to the structure, it is possible to optimize the ground contact shape by forming the ground contact shape into the substantially oval shape or the substantially rectangular shape.

In the pneumatic tire according to the present invention, the protruding portion may not be provided in the ground surface of the land portion which is positioned at the outer side in the tire diametrical direction in the area having the higher arrangement density among the first area and the fifth area. According to the structure, since the ground contact shape can be brought closer to the substantially oval shape, it is possible to improve the high-speed durability and the linearity of the handling.

DETAILED DESCRIPTION OF THE PREFERRED EMBODIMENTS

Figure 1:
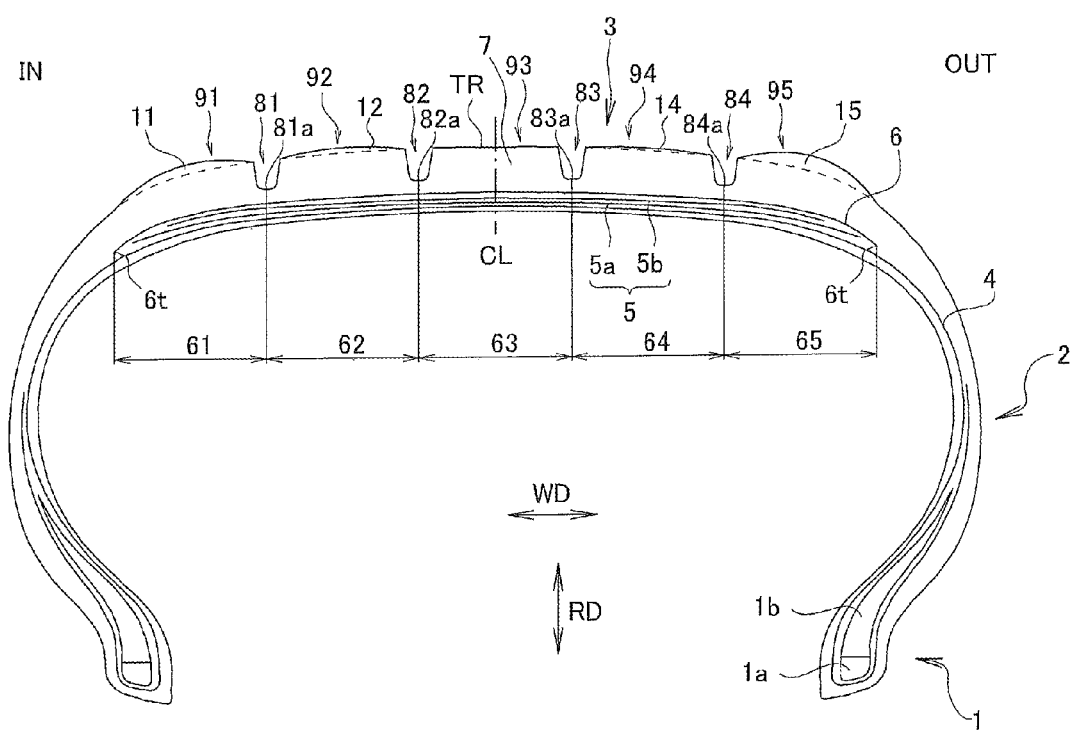
FIG. 1 is a tire meridian cross sectional view showing an example of a pneumatic tire according to the present invention.
Figure 2:
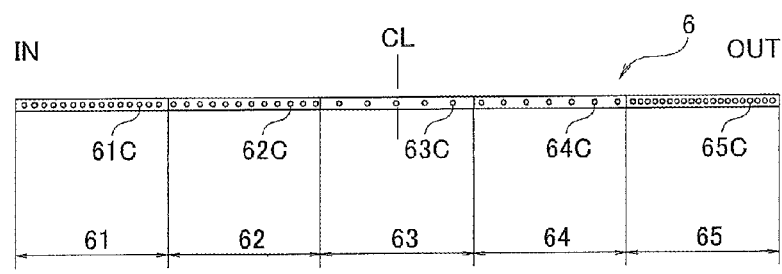
FIG. 2 is a cross sectional view of a belt reinforcing layer.

A description will be given below of an embodiment according to the present invention with reference to the accompanying drawings. FIG. 1 is a tire meridian cross sectional view showing an example of a pneumatic tire according to the present invention. FIG. 2 is a cross sectional view schematically showing a belt reinforcing layer of the pneumatic tire in FIG. 1.

As shown in FIG. 1, the pneumatic tire is provided with a pair of annular bead portions 1, side wall portions 2 each of which extends to an outer side in a tire diametrical direction from each of the bead portions 1, a tread portion 3 which is connected to outside ends in the tire diametrical direction of the side wall portions 2, and a carcass layer 4 which reinforces between a pair of bead portions 1. The carcass layer 4 is constructed by a toroidal carcass ply, and an end portion of the carcass layer 4 is folded back so as to pinch a bead core 1a and a bead filler 1b.

A belt layer 5 reinforcing the carcass layer 4 by a hoop effect is arranged in an outer periphery of the carcass layer 4 in the tread portion 3. The belt layer 5 has two belt plies 5a and 5b having cords which are inclined at an angle between 20 and 30 degrees in relation to a tire circumferential direction, and the belt plies are laminated so that the cords intersect inversely to each other. A belt reinforcing layer 6 mentioned later is arranged in an outer periphery of the belt layer 5.

A tread rubber 7 constructing a ground surface is provided at an outer peripheral side of the belt layer 5 in the tread portion 3. A plurality of main grooves and a plurality of land portions are provided in a tread surface TR which is an outer surface of the tread rubber 7. The main grooves extend along a tire circumferential direction, and the land portions are comparted by the main grooves. In the present embodiment, four main grooves 81, 82, 83 and 84 are provided. Four main grooves 81, 82, 83 and 84 are formed two by two in both sides with a tire equator CL interposed therebetween. Further, four main grooves 81, 82, 83 and 84 are formed two by two between the tire equator CL and an end portion 6t of the belt reinforcing layer.

In the present embodiment, four main grooves 81, 82, 83 and 84 are formed in the tread surface TR, and a plurality of land portions are constituted by a center land portion 93 through which the tire equator CL passes, shoulder land portions 91 and 95 which exist closer to an outer side in a tire width direction WD than a pair of main grooves 81 and 84 positioned at the outermost side, a mediate land portion 92 which is interposed between the center land portion 93 and the shoulder land portions 91, and a mediate land portion 94 which is interposed between the center land portion 93 and the shoulder land portions 95.

The belt reinforcing layer 6 covering substantially a whole width of the belt layer 5 is arranged in an outer side in the tire diametrical direction RD of the belt layer 5. A plurality of reinforcing cords extending along the tire circumferential direction are arranged in the belt reinforcing layer 6. The reinforcing cords are arranged at an angle of inclination which is equal to or less than 5 degrees in relation to the tire circumferential direction. As a material of the reinforcing cord, an organic fiber cord is exemplified. As a raw material of the organic fiber cord, aramid, nylon, polyester and rayon can be exemplified; however, the nylon is preferable.

The belt reinforcing layer 6 can be formed by spirally winding the reinforcing cord at the outer side in the tire diametrical direction RD of the belt layer 5. At this time, an arrangement density of the reinforcing cord can be set by appropriately changing a feed pitch at the winding time. The arrangement density of the reinforcing cord in the present invention means the number of the cords per unit width, and may be often called as an end number.

The belt reinforcing layer 6 is partitioned into five areas by four main grooves 81, 82, 83 and 84, and these areas are called as a first area 61, a second area 62, a third area 63, a fourth area 64 and a fifth area 65 in sequence from a vehicle installation inner side (hereinafter, referred to as an in side) IN toward a vehicle installation outer side (hereinafter, referred to as an out side) OUT in the tire width direction WD. The partition is based on groove bottom centers 81a, 82a, 83a and 84a of the main grooves 81, 82, 83 and 84.

In the present invention, the in side IN is a side which is to be a vehicle inner side when the tire is attached to the vehicle, on the basis of the tire equator CL, and the out side OUT is a side which is to be a vehicle outer side when the tire is attached to the vehicle, on the basis of the tire equator CL. The tire prepared for the in side and the out side is an installing direction designated type tire which is designated to direct the out side to the outer side of the vehicle when attached to the vehicle, and an asymmetrical tread pattern is formed on the basis of the tire equator CL. The designation of the installing direction to the vehicle is carried out, for example, by attaching a display indicating the in side or the out side to the side wall portion of the tire.

In the case that the belt reinforcing layer 6 is partitioned into five areas constituted by the first area 61, the second area 62, the third area 63, the fourth area 64 and the fifth area 65, an arrangement density d5 of a reinforcing cord 65C in the fifth area 65 is higher than an arrangement density d1 of a reinforcing cord 61C in the first area 61, and an arrangement density d2 of a reinforcing cord 62C in the second area 62 is higher than an arrangement density d4 of a reinforcing cord 64C in the fourth area 64. It is possible to optimize the reinforcement strength at right and left of the tire equator CL, that is, at the shoulder portions of the in side IN and the out side OUT, by making the arrangement density d5 of the reinforcing cord 65C in the fifth area 65 existing closest to the out side OUT higher than the arrangement density d1 of the reinforcing cord 61C in the first area 61 existing closest to the in side IN. As a result, it is possible to achieve a sufficient cornering power even when the vehicle turns, while suppressing increase of weight.

On the other hand, in the case that the reinforcement strength is differentiated between right and left of the tire equator CL, that is, the in side IN and the out side OUT, the expansion coefficients are different between right and left, and the conicity tends to be increased. According to the present invention, since the arrangement density d2 of the reinforcing cord 62C in the second area 62 existing at the in side IN is made higher than the arrangement density d4 of the reinforcing cord 64C in the fourth area 64 existing at the out side OUT, the reinforcement strengths at the in side IN and the out side OUT get close, and it is possible to suppress increase of the conicity.

Further, the arrangement density d3 of the reinforcing cord 63C in the third area 63 is preferably the lowest among the arrangement densities in all the areas. Further, the arrangement density in each of the areas is preferably higher than the arrangement density in the area which is closer to the inner side in the tire width direction WD than the former area. In other words, with regard to the in side IN, it is preferable that the arrangement density d1 in the first area 61 is higher than the arrangement density d2 in the second area 62, and the arrangement density d2 in the second area 62 is higher than the arrangement density d3 in the third area 63. With regard to the out side OUT, it is preferable that the arrangement density d5 in the fifth area 65 is higher than the arrangement density d4 in the fourth area 64, and the arrangement density d4 in the fourth area 64 is higher than the arrangement density d3 in the third area 63. According to the structure, since the rigidity at the shoulder portions in both sides is improved, a tire deformation can be suppressed, and it is possible to effectively improve the cornering power.

The arrangement densities in the respective areas are structured, for example, such that the arrangement density d1 in the first area 61 is between 25 and 38 per inch, the arrangement density d2 in the second area 62 is between 20 and 33 per inch, the arrangement density d3 in the third area 63 is between 0 and 21 per inch, the arrangement density d4 in the fourth area 64 is between 10 and 31 per inch, and the arrangement density d5 in the fifth area 65 is between 35 and 40 per inch.

The arrangement density d5 in the fifth area 65 is preferably 2 to 10 per inch higher than the arrangement density d1 in the first area 61, more preferably 3 to 8 per inch higher, and particularly preferably 5 to 7 per inch higher. In the case that a difference between the arrangement density d1 in the first area 61 and the arrangement density d5 in the fifth area 65 is less than two per inch, the rigidity improvement at the out side OUT is insufficient, and the effect of improving the cornering power is insufficient. Further, in the case that the difference between the arrangement density d1 in the first area 61 and the arrangement density d5 in the fifth area 65 exceeds ten per inch, the rigidity difference between the in side IN and the out side OUT becomes too large, the ground contact shape is deteriorated, and the effect of improving the cornering power can not be sufficiently obtained.

The arrangement density d2 in the second area 62 is preferably 2 to 10 per inch higher than the arrangement density d4 in the fourth area 64, more preferably 3 to 8 per inch higher, and particularly preferably 5 to 7 per inch higher. In the case that a difference between the arrangement density d2 in the second area 62 and the arrangement density d4 in the fourth area 64 is less than two per inch, it is impossible to suppress the increase of the conicity by the reinforcement of the right and left shoulder portions. Further, in the case that the difference between the arrangement density d2 in the second area 62 and the arrangement density d4 in the fourth area 64 exceeds ten per inch, the ground contact performance at the in side IN when the vehicle turns is deteriorated, and the effect of improving the cornering power can not be sufficiently obtained.

A total d4+d5 of the arrangement density d4 in the fourth area 64 and the arrangement density d5 in the fifth area 65 is preferably higher than a total d1+d2 of the arrangement density d1 in the first area 61 and the arrangement density d2 in the second area 62. According to the structure, since the rigidity in the out side OUT becomes larger than the rigidity in the in side IN with a central focus on the tire equator CL, it is possible to effectively improve the cornering power.

The difference (d4+d5)−(d1+d2) between the arrangement density in the in side IN and the arrangement density in the out side OUT is preferably between 0 and 8 per inch. If the difference between the arrangement density at the in side IN and the arrangement density at the out side OUT exceeds 8 per inch, the expansion coefficient is greatly different between the in side IN and the out side OUT, and a conicity force in a fixed direction is generated during traveling of the vehicle.

Figure 3:
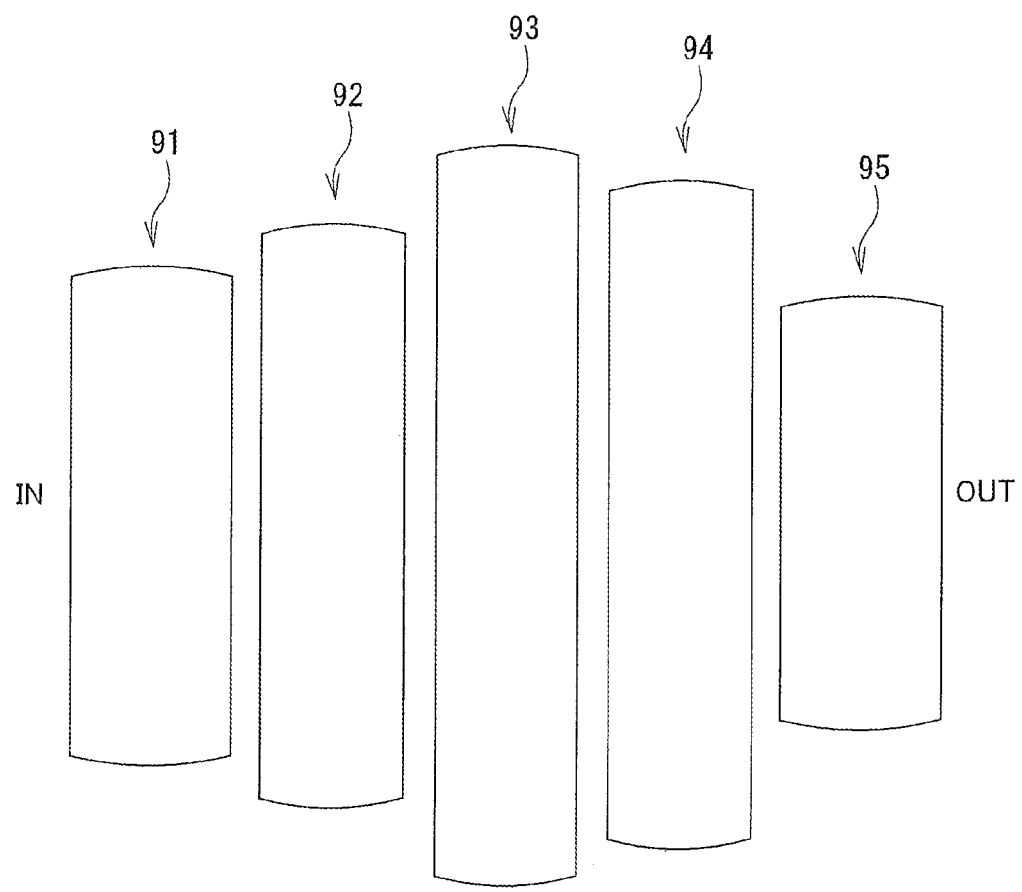
FIG. 3 is a view schematically showing a ground contact shape of the pneumatic tire.

In the case of making the arrangement density of the reinforcing cord of the belt reinforcing layer 6 higher, the expansion coefficient becomes smaller, and the ground contact length becomes shorter. As a result, in the case that the arrangement density of the reinforcing cord is differentiated in each of the areas like the present invention, the ground contact shape becomes irregular, and there is a risk that the irregular wear resistance is deteriorated. FIG. 3 is a view schematically showing the ground contact shape on the assumption that the arrangement density d1 in the first area 61 is set to 30 per inch, the arrangement density d2 in the second area 62 is set to 25 per inch, the arrangement density d3 in the third area 63 is set to 10 per inch, the arrangement density d4 in the fourth area 64 is set to 15 per inch, and the arrangement density d5 in the fifth area 65 is set to 35 per inch. As mentioned above, since the length of the ground contact length varies in accordance with the magnitude of the arrangement density, the ground contact shape becomes irregular.

Accordingly, in the present invention, protruding portions having protruding heights in proportion to the arrangement densities are respectively provided on the ground surfaces of the land portions which are positioned outside in the tire diametrical direction of the areas having the higher density than the third area 63, out of the first area 61, the second area 62, the fourth area 64 and the fifth area 65. The protruding portion is not necessarily provided on the ground surface of the land portion 93 which is positioned outside in the tire diametrical direction in the third area 63.

In the present embodiment, since the arrangement density d3 of the third area 63 is the lowest among the arrangement densities in all the areas, the protruding portions 11, 12, 14 and 15 are respectively provided on the ground surfaces of the land portions 91, 92, 94 and 95 which are positioned outside in the tire diametrical direction in the first area 61, the second area 62, the fourth area 64 and the fifth area 65. In the case that the area having the lower arrangement density than that of the third area 63 exists in the first area 61, the second area 62, the fourth area 64 and the fifth area 65, the protruding portion is not necessarily provided on the land portion which is positioned outside in the tire diametrical direction in the area.

The protruding portions 11, 12, 14 and 15 are provided over a whole periphery in the tire circumferential direction with a fixed cross sectional shape. The cross sectional shape of the protruding portions 11, 12, 14 and 15 according to the present embodiment is formed into an substantially semicircular shape (D-shape). Heights of both ends in the tire width direction of the protruding portion are zero. Further, the cross sectional shape of the protruding portion is preferably such a shape that the protruding height is reduced little by little toward both ends in the tire width direction as mentioned above.

Figure 4:
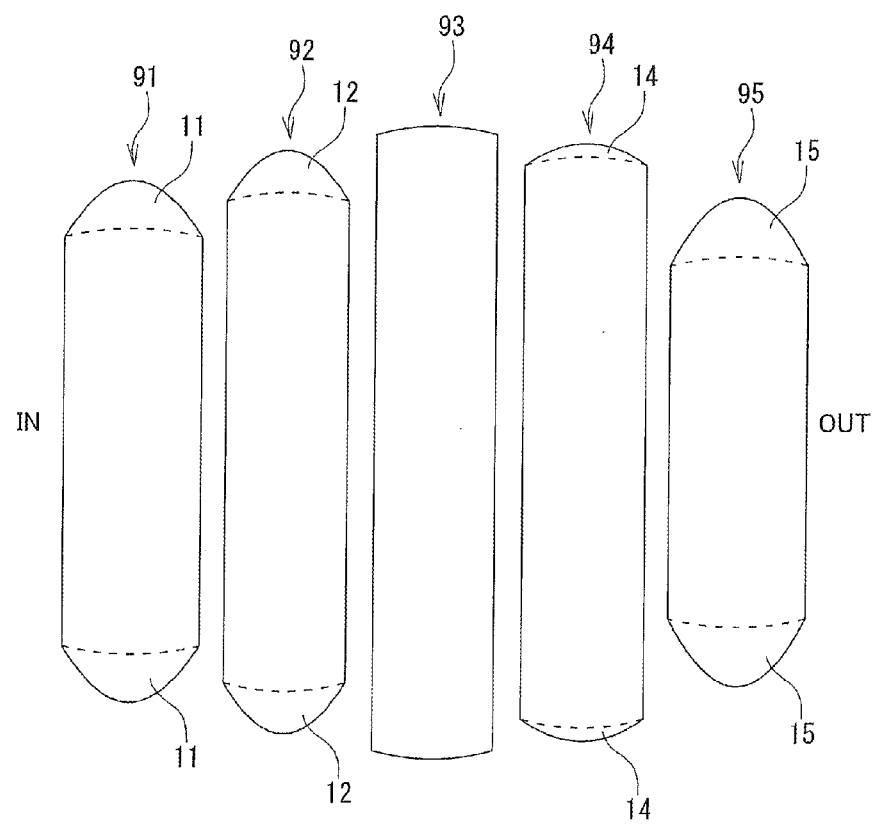
FIG. 4 is a view schematically showing a ground contact shape of the pneumatic tire according to the present invention.

FIG. 4 is a view schematically showing the ground contact shape in the case that the protruding portions 11, 12, 14 and 15 are respectively provided on the ground surfaces of the land portions 91, 92, 94 and 95 like FIG. 1. The ground contact length in the land portion becomes longer in comparison with the case of FIG. 3 by the provision of the protruding portions 11, 12, 14 and 15 on the ground surfaces of the land portions 91, 92, 94 and 95. Further, the ground contact shape can be optimized by making the protruding heights of the protruding portions 11, 12, 14 and 15 proportional to the arrangement density. As a result, it is possible to maintain the irregular wear resistance.

Figure 5A:
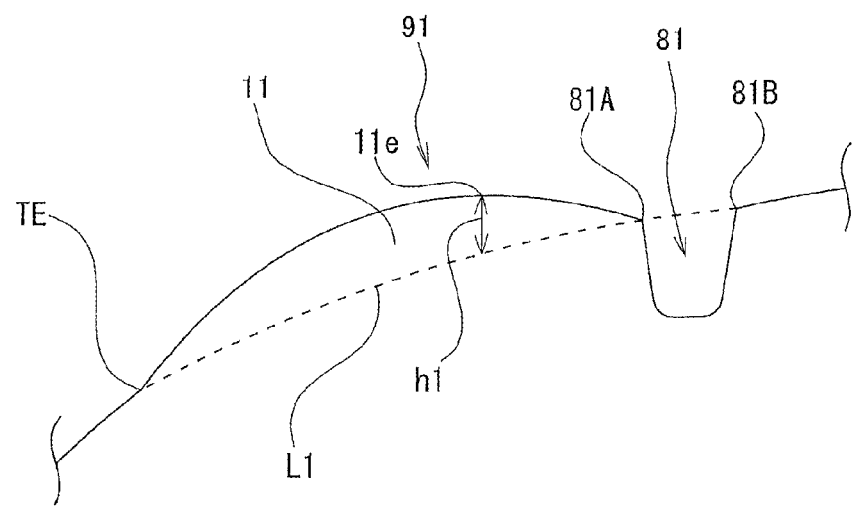
FIG. 5A is an enlarged view of a protruding portion.
Figure 5B:
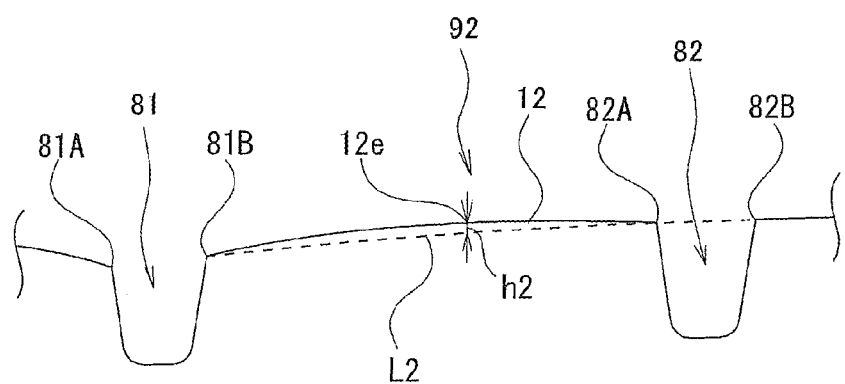
FIG. 5B is an enlarged view of the protruding portion.
Figure 5C:
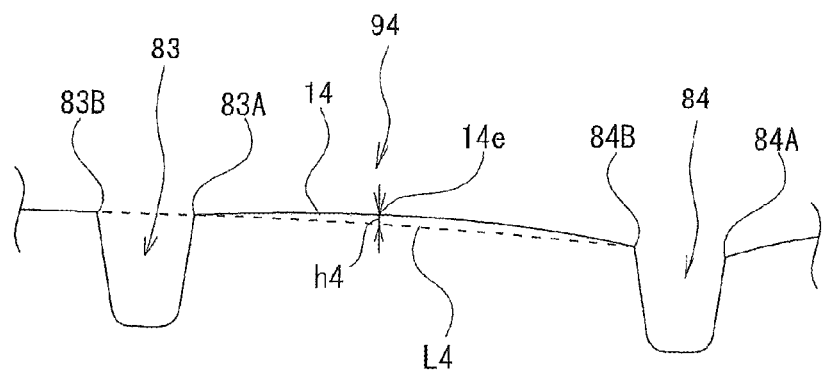
FIG. 5C is an enlarged view of the protruding portion.
Figure 5D:
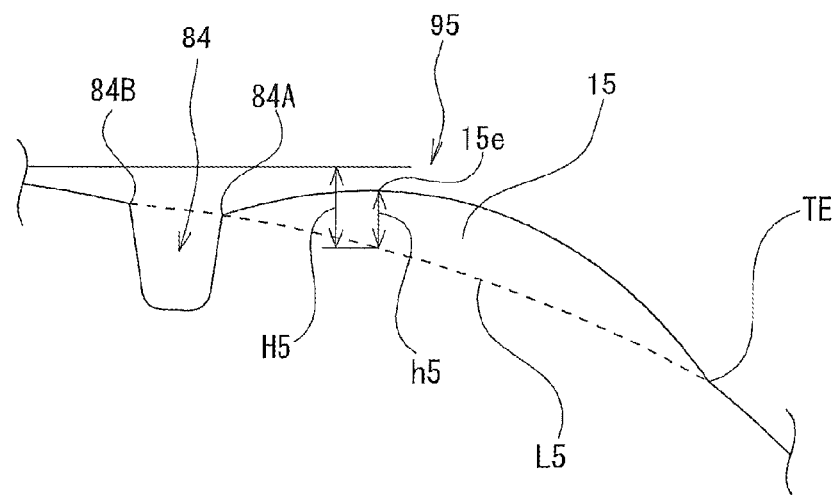
FIG. 5D is an enlarged view of the protruding portion.

The protruding heights of the protruding portions 11, 12, 14 and 15 are respectively set to h1, h2, h4 and h5. FIG. 5A is an enlarged view of the protruding portion 11, FIG. 5B is an enlarged view of the protruding portion 12, FIG. 5C is an enlarged view of the protruding portion 14, and FIG. 5D is an enlarged view of the protruding portion 15. The protruding height h1 is a distance in the tire diametrical direction from a protruding end 11e of the outermost portion in the tire diametrical direction to a virtual line L1. The virtual line L1 is a circular arc which passes through three points constituted by a ground contact end TE and both ends 81A and 81B in the tire width direction of the main groove 81. The protruding height h2 is a distance in the tire diametrical direction from a protruding end 12e of the outermost portion in the tire diametrical direction to a virtual line L2. The virtual line L2 is a circular arc which passes through three points constituted by the one end 81B in the tire width direction of the main groove 81 and both ends 82A and 82B in the tire width direction of the main groove 82. The protruding height h4 is a distance in the tire diametrical direction from a protruding end 14e of the outermost portion in the tire diametrical direction to a virtual line L4. The virtual line L4 is a circular arc which passes through three points constituted by the one end 84B in the tire width direction of the main groove 84 and both ends 83A and 83B in the tire width direction of the main groove 83. The protruding height h5 is a distance in the tire diametrical direction from a protruding end 15e of the outermost portion in the tire diametrical direction to a virtual line L5. The virtual line L5 is a circular arc which passes through three points constituted by the ground contact end TE and both ends 84A and 84B in the tire width direction of the main groove 84.

The protruding heights h1, h2, h4 and h5 of the protruding portions 11, 12, 14 and 15 are in proportion to the arrangement densities in the respective areas. More specifically, on the assumption that the protruding height h5 of the protruding portion 15 is x, the protruding height h1 of the protruding portion 11 is set to (d1/d5) time of x, the protruding height h2 of the protruding portion 12 is set to (d2/d5) time of x, and the protruding height h4 of the protruding portion 14 is set to (d4/d5) time of x.

The protruding height h5 of the protruding portion 15 provided on the ground surface of the land portion 95 which is positioned outside in the tire diametrical direction of the fifth area 65 having the highest arrangement density is preferably set to 0.7 to 0.9 times of a tire diametrical height H5 from a virtual line L5 to the tire largest outer diameter position while passing through the protruding end 15e.

Figure 6:
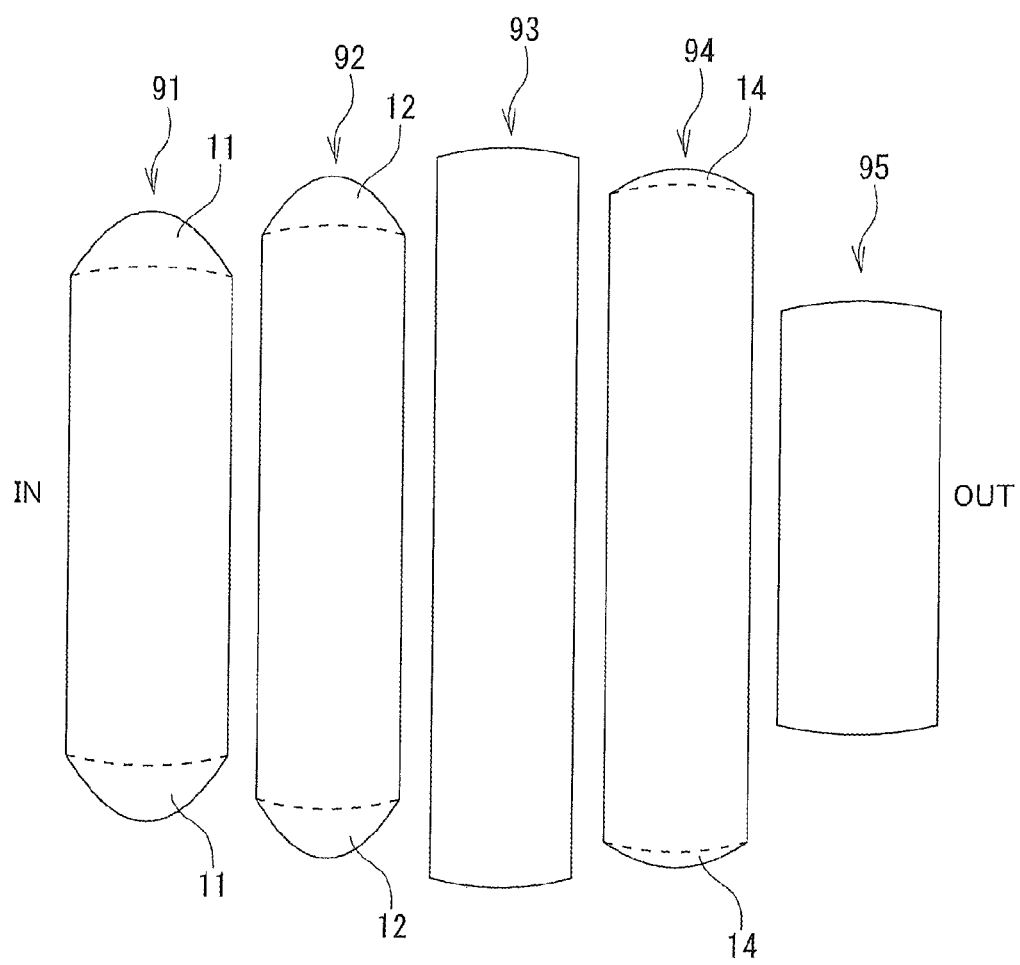
FIG. 6 is a view schematically showing a ground contact shape of a pneumatic tire according to the other embodiment.

Other Embodiment (1) In the embodiment mentioned above, the protruding portions are respectively provided on the ground surfaces of the land portions which are positioned outside in the tire diametrical direction in all the areas except the third area 63; however, the protruding portion may not be provided on the ground surface of the land portion which is positioned outside in the tire diametrical direction in the area having the high arrangement density, out of the first area 61 and the fifth area 65. As opposed to the embodiment shown in FIG. 1, in the case that the protruding portion is not provided on the ground surface of the land portion 95 which is positioned outside in the tire diametrical direction in the fifth area 65, a ground contact shape as shown in FIG. 6 is formed. According to the structure, since the ground contact shape can be made closer to an substantially oval shape by making the ground contact length of the end portion in the tire width direction shorter, it is possible to make the high-speed durability and the linearly of the handling better. As this time, the protruding height h1 of the protruding portion 11 provided on the ground surface of the land portion 91 is preferably set to 0.6 to 0.8 times of the height in the tire diametrical direction from the virtual line L1 to the tire largest outer diameter position while passing through the protruding end 11e.

(2) In the embodiment mentioned above, the belt reinforcing layer 6 is constructed by one layer, but, may be constructed by two layers. At this time, the arrangement density of the reinforcing cord may be set as mentioned above in the belt reinforcing layer 6 of at least one layer.

EXAMPLES

The description will be given below of examples which specifically show the structure and the effect of the present invention. Evaluation items in the examples will be measured as follows.

Irregular Wear Resistance

A tire was installed to an actual car, a tire wear amount was measured after traveling at 15000 km on a dry road, the wear amount was measured at a center portion and a shoulder portion on a tread surface, and an irregular wear ratio (the wear amount of the shoulder portion/the wear amount of the center portion) was calculated. As the irregular wear ratio is closer to 1.0, the wear is more even, thereby indicating an excellent irregular wear resistance.

The pneumatic tire shown in FIG. 1 was set to an example (referred to the ground contact shape in FIG. 4). The arrangement density d1 in the first area 61 was set to 30 per inch, the arrangement density d2 in the second area 62 was set to 25 per inch, the arrangement density d3 in the third area 63 was set to 10 per inch, the arrangement density d4 in the fourth area 64 was set to 15 per inch, and the arrangement density d5 in the fifth area 65 was set to 35 per inch. An example 2 was structured in the same manner as the example 1 except a matter that the protruding portion 15 is not provided on the ground surface of the land portion 95 (referred to the ground contact shape in FIG. 6). A comparative example 1 was structured in the same manner as the example 1 except a matter that the protruding portion is not provided on any ground surfaces of the land portions (referred to the ground contact shape in FIG. 3).

As a result of the evaluation, the irregular wear ratio was 0.4 in the comparative example 1, 0.98 in the example 1, and 0.91 in the example 2. In other words, the pneumatic tires according to the example 1 and the example 2 were better in the irregular wear resistance in comparison with the comparative example 1. Therefore, the pneumatic tire according to the present invention can improve the cornering power while suppressing the increase of the conicity and can maintain the irregular wear resistance.

DESCRIPTION OF REFERENCE NUMERALS 3 tread portion
5 belt layer
6 belt reinforcing layer
61 first area
62 second area
63 third area
64 fourth area
65 fifth area
91 land portion
92 land portion
93 land portion
94 land portion
95 land portion
11 protruding portion
12 protruding portion
14 protruding portion
15 protruding portion
IN vehicle installation inner side (in side)
OUT vehicle installation outer side (out side)

What is claimed is:

1. A pneumatic tire comprising:
a belt layer which is buried in a tread portion;
a belt reinforcing layer which is arranged in an outer side in a tire diametrical direction of the belt layer and in which a plurality of reinforcing cords extending along a tire circumferential direction are arranged;
four main grooves which are formed on an outer surface of the tread portion, and are arranged two by two in both sides with a tire equator interposed therebetween; and
land portions which are comparted by the four main grooves,
wherein the belt reinforcing layer is partitioned into five areas constituted by a first area, a second area, a third area, a fourth area and a fifth area in a tire width direction from a vehicle installation inner side toward a vehicle installation outer side in this order by the four main grooves, an arrangement density of the reinforcing cord in the fifth area is higher than an arrangement density of the reinforcing cord in the first area, and an arrangement density of the reinforcing cord in the second area is higher than an arrangement density of the reinforcing cord in the fourth area, and
wherein protruding portions having protruding heights in proportion to the arrangement densities are provided on ground surfaces of the land portions which are positioned outside in the tire diametrical direction in the areas having the higher density than that of the third area, out of the first area, the second area, the fourth area and the fifth area.

2. The pneumatic tire according to claim 1, wherein the arrangement density of the first area is higher than the arrangement density in the second area.

3. The pneumatic tire according to claim 1, wherein a protruding end of one of the protruding portions is positioned closer to the inner side in the tire diametrical direction than the tire largest outer diameter in a tire equator.

4. The pneumatic tire according to claim 1, wherein a protruding portion is not provided on the ground surface of the land portion which is positioned outside in the tire diametrical direction in the area having the higher arrangement density among the first area and the fifth area.

5. The pneumatic tire according to claim 1, wherein the protruding heights of the protruding portions are reduced little by little toward both ends of each protruding portion in the tire width direction.

6. The pneumatic tire according to claim 1, wherein the arrangement density of the second area is higher than the arrangement density in the third area.

7. The pneumatic tire according to claim 1, wherein the arrangement density of the fifth area is higher than the arrangement density in the fourth area.

8. The pneumatic tire according to claim 1, wherein the arrangement density of the fourth area is higher than the arrangement density in the third area.

* * * * *